US008967673B2

(12) United States Patent
Morgan et al.

(10) Patent No.: US 8,967,673 B2
(45) Date of Patent: Mar. 3, 2015

(54) TRAILER HAVING AN ENCLOSED TANK AREA WITH INTEGRAL TOOLBOX

(75) Inventors: John Morgan, Stow, OH (US); Michael A. Conny, Beloit, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 93 days.

(21) Appl. No.: 13/440,603

(22) Filed: Apr. 5, 2012

(65) Prior Publication Data

US 2013/0266411 A1   Oct. 10, 2013

(51) Int. Cl.
*B60P 3/22* (2006.01)
*B60P 3/24* (2006.01)

(52) U.S. Cl.
CPC ..................................... *B60P 3/24* (2013.01)
USPC ....................................................... 280/837

(58) Field of Classification Search
CPC .............. B60P 3/22; B60P 3/24; B60P 3/221; B60P 3/2205
USPC .............................. 280/837; 222/132; 406/43
See application file for complete search history.

(56) References Cited

U.S. PATENT DOCUMENTS

| 1,886,197 | A | * | 11/1932 | Kramer | 280/837 |
| 3,217,909 | A | * | 11/1965 | Heise | 414/572 |
| 3,980,212 | A | * | 9/1976 | Aller et al. | 406/119 |
| 5,067,856 | A | * | 11/1991 | Sisk | 406/41 |
| 6,350,086 | B1 | * | 2/2002 | Dibble et al. | 406/197 |
| 7,244,123 | B1 | * | 7/2007 | Barron | 434/226 |
| 2010/0013206 | A1 | * | 1/2010 | Markham | 280/837 |

* cited by examiner

*Primary Examiner* — Joseph Rocca
*Assistant Examiner* — Felicia L Brittman
(74) *Attorney, Agent, or Firm* — Sand & Sebolt

(57) ABSTRACT

A trailer having an enclosed area with an integral toolbox is presented. The trailer includes a bulk tank with at least a first hopper and a second hopper. The first hopper has a first discharge port and the second hopper has a second discharge port. A discharge pipe is connected to the first and second discharge ports. A storage box is formed between and integral with the first hopper and the second hopper to define a storage chamber. A door is mounted on the storage box having open and close positions for respectively providing access to and blocking access to the storage chamber.

20 Claims, 9 Drawing Sheets

TRAILER HAVING AN ENCLOSED TANK AREA WITH INTEGRAL TOOLBOX

BACKGROUND OF THE INVENTION

1. Technical Field

The present invention is related generally to bulk tankers and bulk tank trailers. More particularly, the present invention is related to systems and methods of storing tools and equipment associated with bulk tankers and bulk tank trailers. Specifically, the present invention is related to bulk tankers and bulk trailers having an enclosed tank area with an integral toolbox.

2. Background Information

Bulk tankers and bulk tank trailers are among the many types of vehicles used for hauling materials over highways and the like. They typically have several hoppers or cones which facilitate the discharge of the bulk material from within the tank into a discharge line through which air is pumped to discharge the material to a rear end of the trailer. Valve assemblies are located at the bottom of the hoppers whereby the hoppers may be opened or closed to respectively allow the flow of the bulk particulate material from the hoppers into the discharge pipe or to cut off this flow. An additional aeration line or heated blow pipe typically runs along one side of the hoppers to provide air for stirring the bulk material within the hoppers to facilitate the downward movement of the material within the hoppers. During operation, this blow pipe typically becomes hot enough to cause burn injuries to truck drivers who are unloading the bulk material. Other pipes branching off of this aeration line may also become hot enough to cause burn injuries. The occurrence of such burn injuries is increased due to the fact that the handles for operating the discharge valves for the hoppers require the truck driver or other operator to stoop down below the hot blow pipe and maneuver adjacent any of these heated pipes. Maintaining the hoppers, their discharge valves and performing other maintenance on bulk tankers often requires the use of a variety of tools. Therefore, there exists a need for a better way to access and store tools associated with bulk tankers and tanker trailers.

BRIEF SUMMARY OF THE INVENTION

The preferred embodiment of the invention includes a trailer having an integrated chamber with a toolbox. The trailer includes a bulk tank with at least a first hopper and a second hopper. The first hopper has a first discharge port and the second hopper has a second discharge port. A discharge pipe is connected to the first and second discharge ports. A storage box is formed integral and between the first hopper and the second hopper to define a storage chamber. A door is mounted on the storage box having open and close positions for respectively providing access to and blocking access to the storage chamber.

In one configuration of the preferred embodiment, a portion of the first hopper forms a portion of a first wall of the storage chamber and a portion of the second hopper forms a portion of a second wall of the storage chamber. Similarly, a first portion of the storage chamber can be below the first hopper and a second portion of the storage chamber can be directly below the second hopper.

The door covers an opening to the storage chamber. The door includes a door perimeter wall projecting outward from a rear surface of the door toward the storage chamber when the door is in the closed position. The storage chamber includes a chamber perimeter wall outwardly projecting from a perimeter around the opening toward the door. When the door is in the closed position, the door perimeter wall is adjacent and outside the chamber perimeter wall so that the front of the door and the door perimeter wall cover the opening and the chamber perimeter wall and the opening. A waterproof sealer can be attached to either the door perimeter wall or the chamber perimeter wall. The waterproof seal can then create a waterproof seal between the door perimeter wall and the chamber perimeter wall when the door is in the closed position. A hinge can be used to mount the door to the storage box and a lock can be mounted on the door for locking the door in the closed position.

Another configuration of the preferred embodiment includes a bulk trailer with a frame and a set of ground-engaging wheels mounted to the frame. A bulk tank comprising two or more hoppers is attached to the frame. An enclosure is integrally formed with one of the hoppers. A toolbox with an interior chamber is secured to the frame within the enclosure. The toolbox can be directly in front of a hopper or directly behind a hopper.

In some configurations, one of the hoppers is a first hopper that is the frontmost hopper and the toolbox is directly in front of the front hopper. The bulk tank can have a rear end and a top. A ladder can be located adjacent the rear end of the bulk tank extending downwardly from the top of the bulk tank. When the first hopper serves as a rearmost hopper, the toolbox can be directly behind the first hopper. The bulk tank can also have a front end. The ladder can be adjacent the front end of the bulk tank and extend downwardly from the top of the bulk tank.

In other configurations of the preferred embodiment, there may be other useful features. For example, a portion of the toolbox can be below the first hopper and/or a second hopper. The toolbox can additionally be between the first hopper and the second hopper. A door can be mounted on the toolbox adapted to move between a closed position to prevent access to the interior chamber of toolbox or an open position allowing access to the interior chamber of toolbox. The bulk trailer can include a sidewall extending between the first hopper and the second hopper with an access opening formed in the sidewall for accessing the toolbox. A lock can be included on the door to prevent unauthorized access to the toolbox.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE INVENTION

Figure 1:
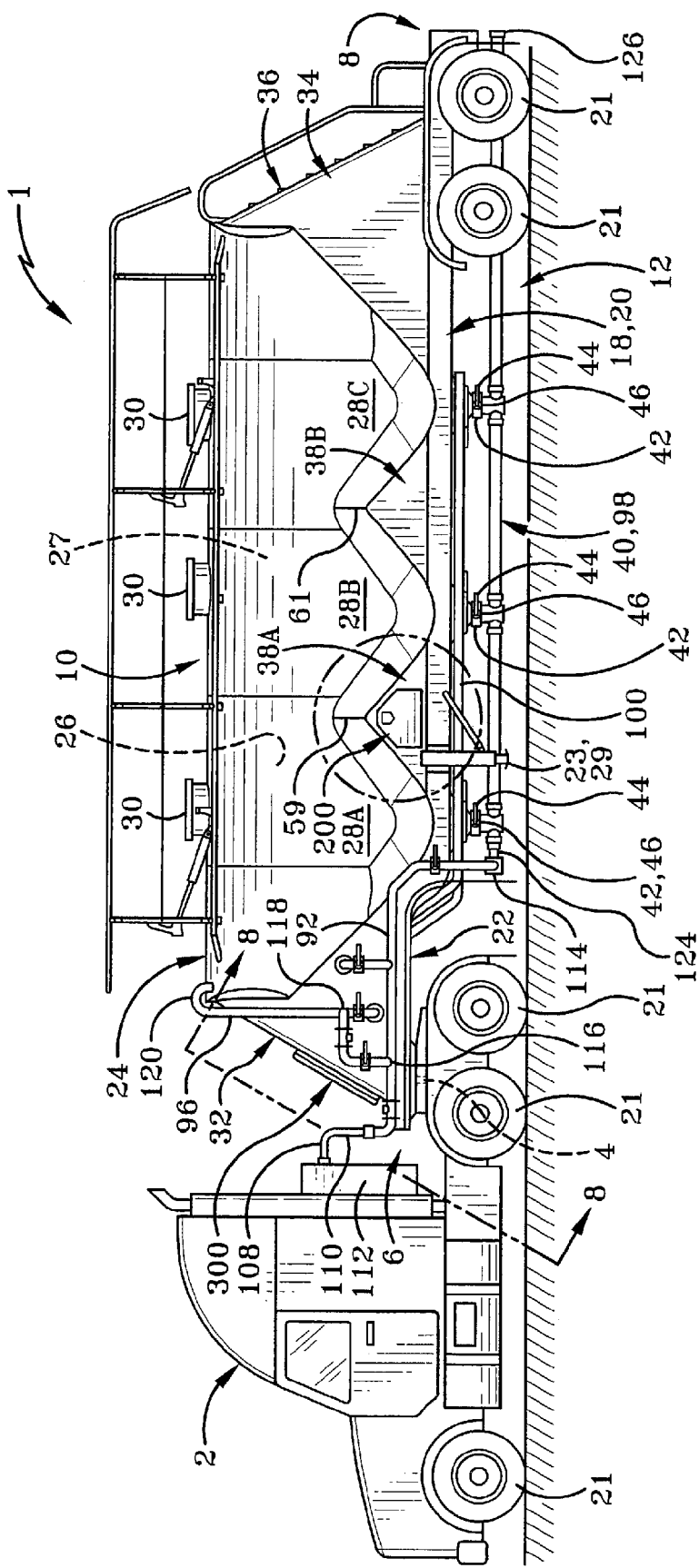
FIG. 1 is a side elevational view of the bulk tanker and bulk tank trailer of the preferred embodiment of the present invention.

A bulk tank trailer of the preferred embodiment of the present invention is shown generally at 1 in FIG. 1. A trailer 1 is a towed vehicle which is typically towed by a towing vehicle in the form of an on-road tractor 2 whereby trailer 1 and the tractor 2 form a tractor trailer rig in the form of a bulk tanker. More particularly, the front of the trailer 1 is pivotally hitched to the rear of tractor 2 via a hitch 4 such as a fifth wheel hitch or the like. Trailer 1 has a front 6 and a back 8 defining therebetween a longitudinal direction. Trailer 1 further has a top 10 and a bottom 12.

Figure 4:
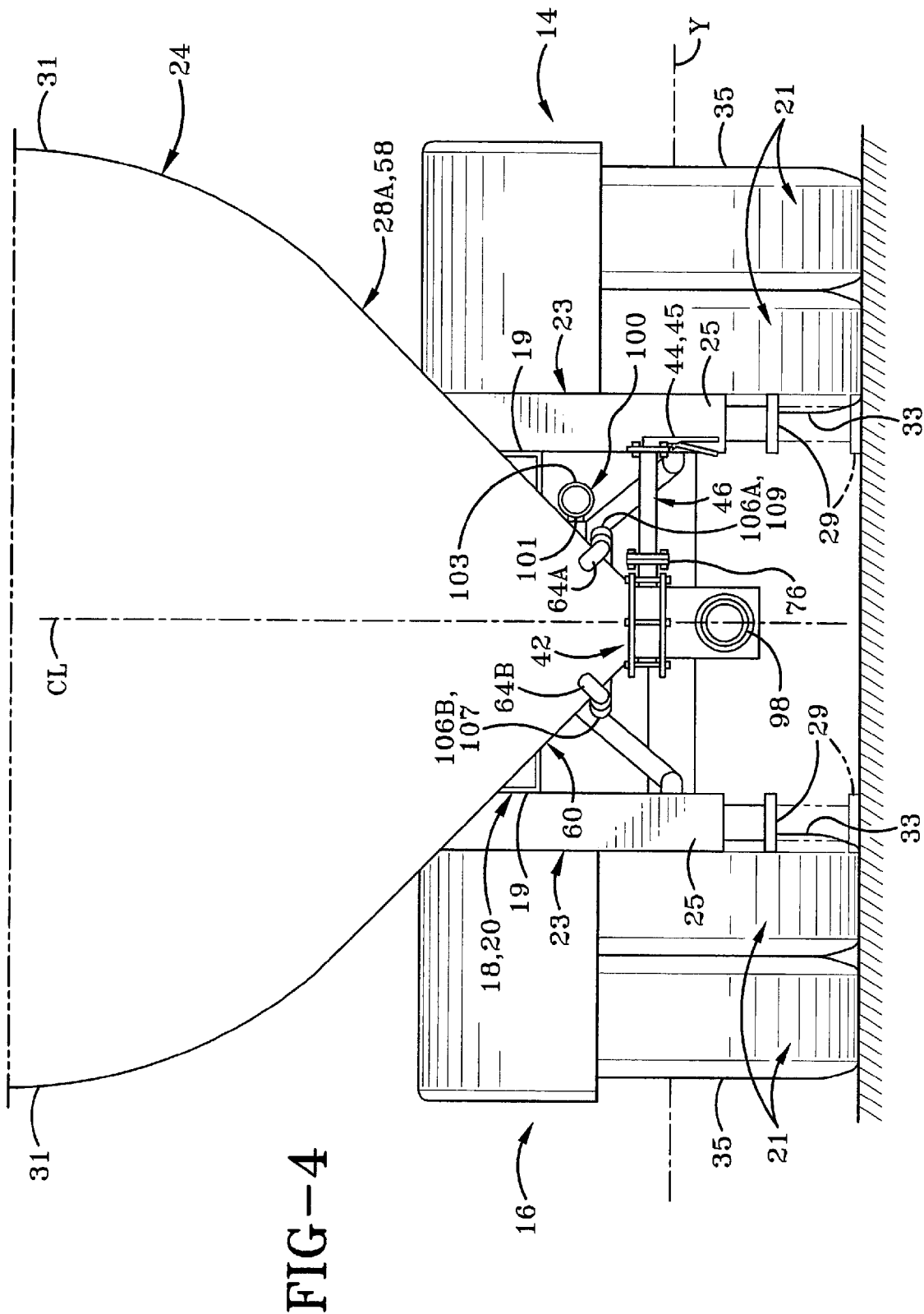
FIG. 4 is an enlarged front elevational view of the trailer taken forward of the frontmost hopper with the front deck, front enclosure and portions of the air pipe assembly removed for clarity.

Trailer 1 further includes a left side 14 and a right side 16 (FIG. 4) defining therebetween an axial direction. Left side 14 is typically the driver side whereas right side 16 is typically the passenger side although this may be the opposite in various countries. For clarity, an explanation of some terms used herein is provided. The trailer 1 has an axial center line CL (FIG. 4) or center plane which is a vertical longitudinally extending plane cutting through the center of the trailer midway between the left side 14 and right side 16 thereof. As is readily evident from the Figures, various components are axially offset or spaced from the center plane. The present description of the trailer 1 will make reference to certain components, sides, surfaces, points and the like as being inboard or outboard of one another. As will be appreciated, such terms typically relate to the left or right halves of the trailer whereby with regard to the left half (left of central plane CL), a first point which is outboard of a second point is further to the left than the second point or further outboard than the second point in a first or left outboard direction, and thus the second point is inboard of or to the right of the first point. Thus, within the left half, the first point is further outboard or further from the center plane than is the second point. Likewise, with regard to the right half (right of central plane CL), a third point which is outboard of a fourth point is further to the right than the fourth point or further outboard than the fourth point in a second or right outboard direction, and thus the fourth point is inboard of or to the left of the third point. Thus, within the right half, the third point is further outboard or further from the center plane than is the fourth point.

Figure 6:
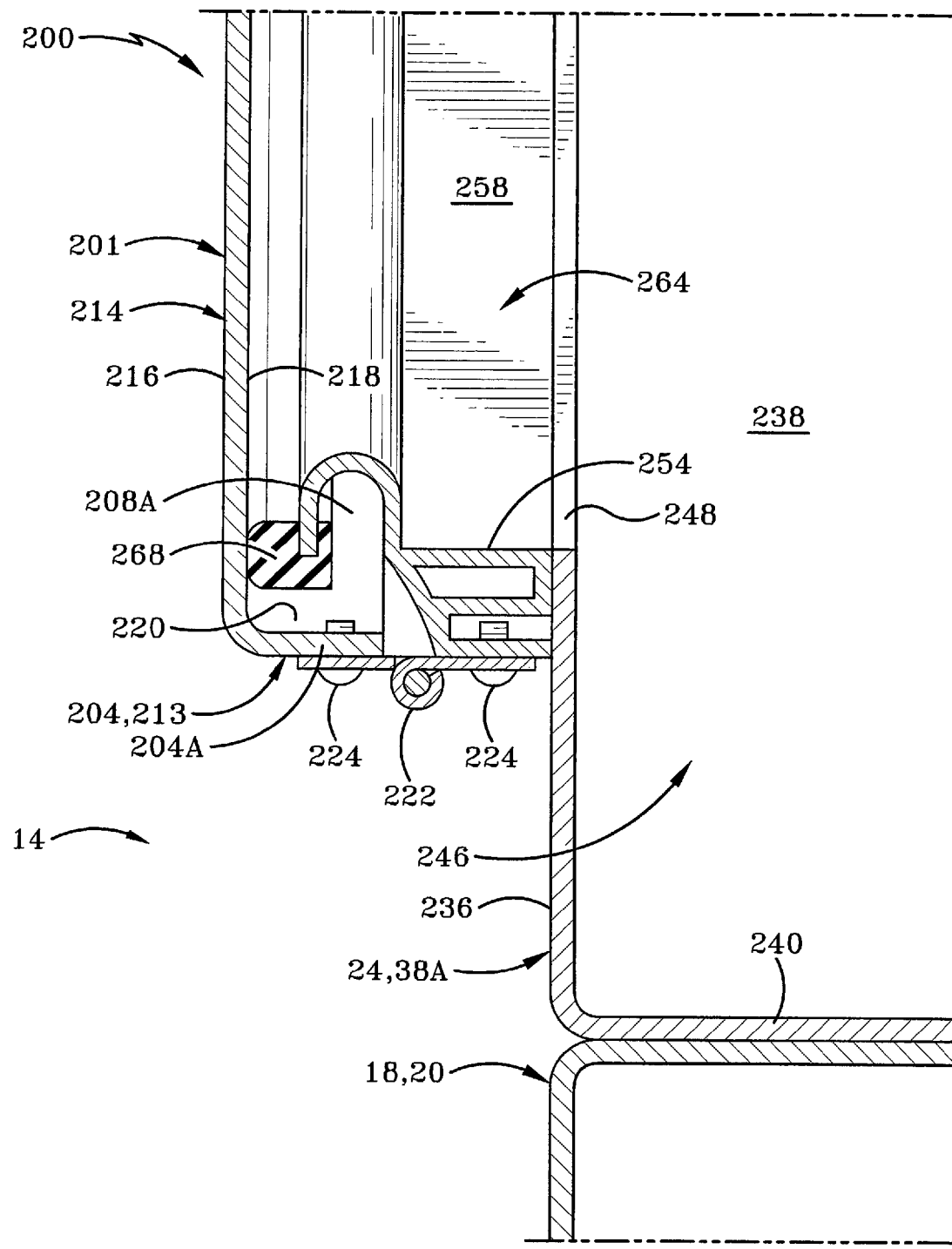
FIG. 6 is an example cross-sectional view of the door of the integrated toolbox.
Figure 7:
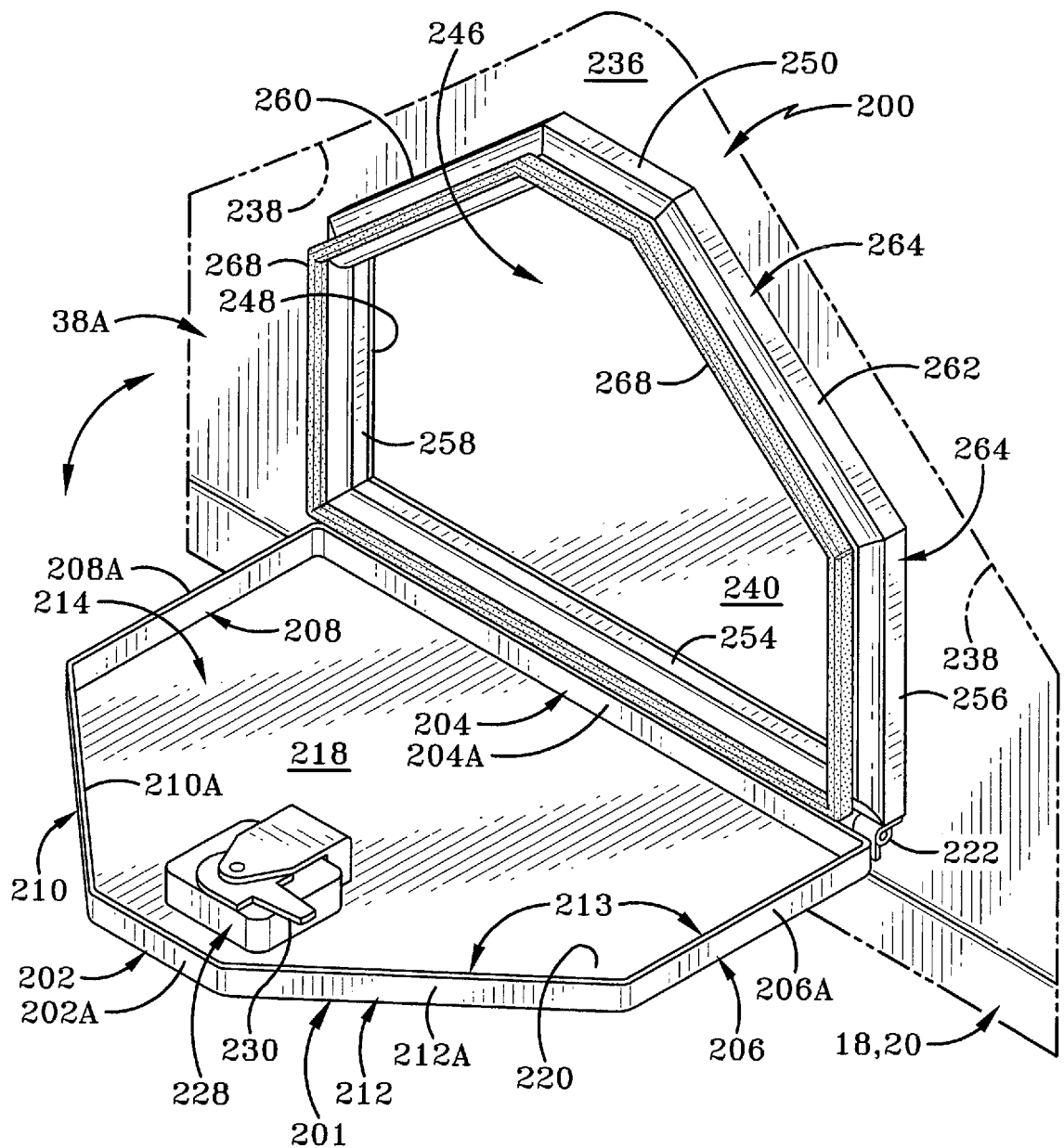
FIG. 7 is an example illustration of the integrated toolbox located between two hoppers on a hopper trailer with its door in an open position.

With primary reference to FIG. 1, trailer 1 has a rigid frame 18 including a substantially horizontal longitudinally elongated main drop or lower deck 20 and a substantially horizontal front raised or higher deck 22 which is adjacent front 6. Deck 20 has left and right vertical outboard sides 19 (FIG. 6) which face away from and are parallel to center plane CL. Sides 19 are longitudinally elongated, extending from the front of deck 20 to the back of deck 20. Ground engaging wheels 21 are rotatably mounted on frame 18 about a horizontal axially extending axis Y (FIG. 4) via a suitable suspension assembly adjacent back 8. Some axles can include pairs of wheels on each end of an axle so that there are inner wheels 33 adjacent outer wheels 35. Deck 20 extends from adjacent the back of front deck 22 to adjacent wheels 21 and back end 8 of trailer 1. Tractor 2 also has ground engaging wheels 21, some of which are driven by the tractor's engine in the standard fashion.

Trailer 1 further includes landing gear 23 generally adjacent front 6. Landing gear 23 may be of any suitable type known in the art and is configured to move between a lowered position (dashed lines in FIG. 4) in contact with the ground for supporting the front of trailer 1 when disconnected from tractor 2 and a raised position (FIG. 1 and solid lines in FIG. 4) out of contact with the ground when trailer 1 is hitched to tractor 2 for over the road travel. More particularly, landing gear 23 includes left and right vertical legs 25 and a ground engaging foot 29 secured to the bottom of leg 25. Particularly, each leg 25 is a telescoping leg which includes an upper leg section and a lower leg section which is telescopically mounted on the upper section to move vertically between the raised and lowered positions along with foot 29. The upper section of the left leg 25 is rigidly secured to the left outboard side 19 of deck 20 and extends axially outboard and downwardly therefrom. Likewise, the top section of the right leg 25 is rigidly attached to the outboard right side 19 of deck 20 and extends axially in the opposite outboard direction therefrom and downwardly therefrom.

Trailer 1 further includes a bulk tank 24 having left and right outboard sides 31 (FIG. 4) which face away from the axial center plane CL. Tank 24 defines an interior bulk storage chamber 26 for carrying dry particulate material 27 in bulk. Material 27 may be, for example, sand, plastic beads, pellets or any other solid particulate material typically carried in bulk tank trailers. Bulk tank 24 typically includes several hoppers or cones 28. In the exemplary embodiment, hoppers 28 include three hoppers 28A-C wherein hopper 28A is the frontmost hopper and hopper 28C is the rearmost hopper. Hopper 28B is directly behind hopper 28A, while hopper 28C is directly behind hoppers 28A and B. Although trailer 1 includes three hoppers, such trailers are also typically configured with two or four hoppers, and possibly more. Center plane CL (FIG. 4) cuts through the axial center of tank 24 midway between outboard sides 31 and through the axial center of each of hoppers 28. A plurality of hopper feed ports 30, including openable and closable lids, are mounted on top of tank 24 respectively directly above hoppers 28 whereby there are typically the same number of ports 30 as hoppers 28. Ports 30 may be opened in order to receive bulk material 27 there through to fill chamber 26 to a desired level. The lids of the ports may be closed to secure the material therein and keep moisture and other material out of the interior chamber and to provide a generally airtight seal.

Trailer 1 further includes a front enclosure 32 which is rigidly secured to and extends upwardly from front deck 22 to the top 10 of bulk tank 24. Enclosure 32 is also rigidly secured to and extends forward from the front of hopper 28A to adjacent front end 6. Trailer 1 further includes a rear enclosure 34 which is rigidly secured to and extends upwardly from the top of rear deck 20 adjacent the back end 8 to the top rear of tank 24. Rear enclosure 34 is also rigidly secured to and extends rearwardly from the back end of hopper 28C. Trailer 1 can further include a built-in ladder 36 which is formed integrally with rear enclosure 34 and provided with suitable handrails. Trailer 1 further includes two lower enclosures 38A and 38B, each of which is between an adjacent pair of the hoppers 28. Each lower enclosure 38 is rigidly secured to deck 20 and extends upwardly therefrom to a rigid connection to the rear of one hopper 28 and the front of the adjacent hopper 28. Deck 20 extends from longitudinally adjacent the bottom of front hopper 28A and forward of hoppers 28B and 28C to longitudinally adjacent and rearward of hoppers 28B and 28C. Deck 20 also extends from forward of lower enclosures 38A and 38B to rearward thereof, and from forward of rear enclosure 34 to rearward thereof.

Trailer 1 can further include an air piping assembly 40 which is used to facilitate the discharge of material 27 from within interior chamber 26. A valve assembly 42 is secured to the bottom of each hopper 28 and includes a valve which is operated by a substantially straight rigid valve control handle 44. Handle 44 is rotatable between an open position and a closed position. In the exemplary embodiment, the frontmost valve assembly 42, handle 44 and the bottom of hopper 28A are forward of landing gear 23 whereas the other valve assemblies 42, handles 44, and bottoms of the other hoppers 28B, 28C are rearward of landing gear 23. Center plane CL (FIG. 4) cuts through the axial center of each of valve assemblies 42.

Figure 2:
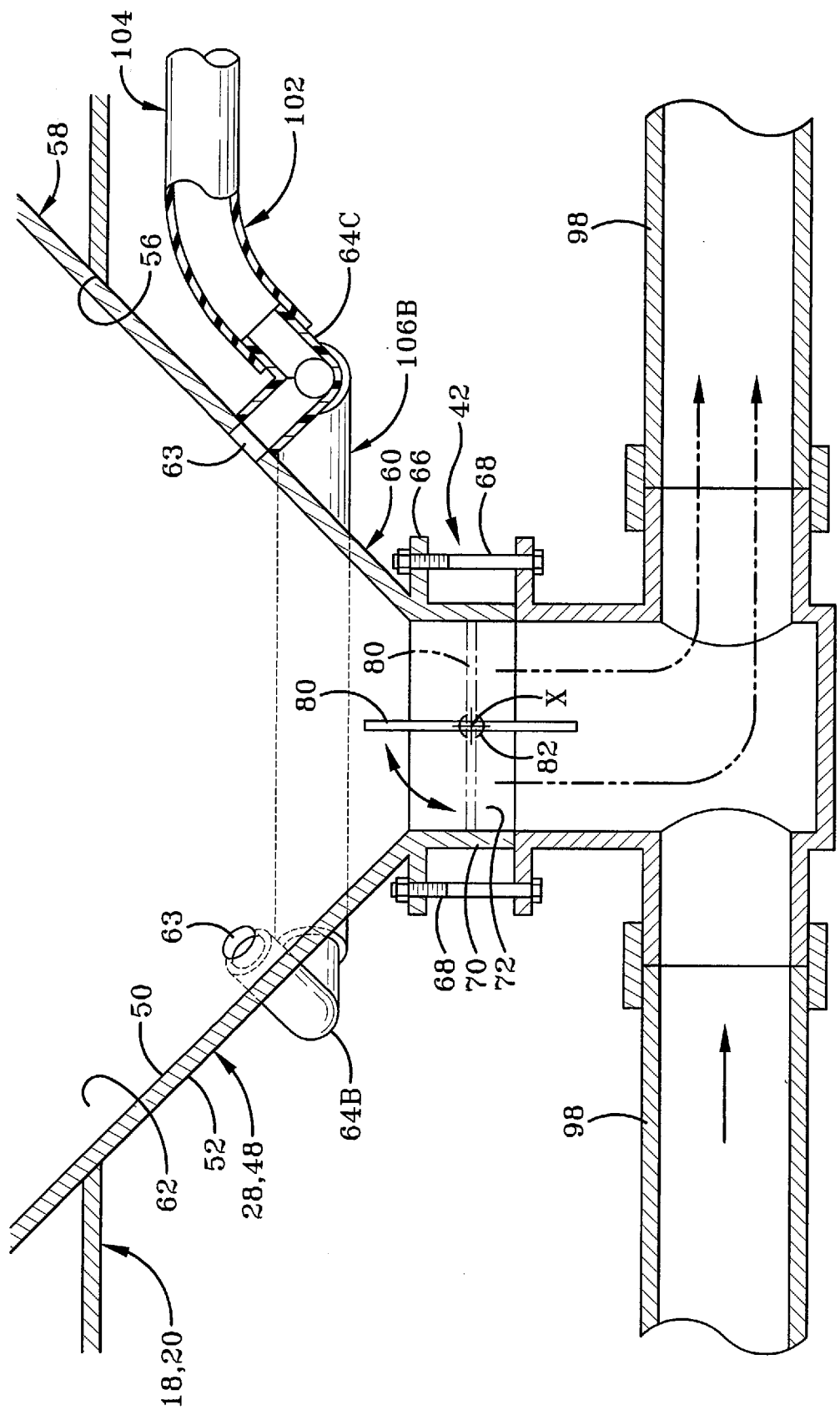
FIG. 2 is an enlarged sectional view through the axial center of one of the hoppers and associated structures taken from the left side.
Figure 3:
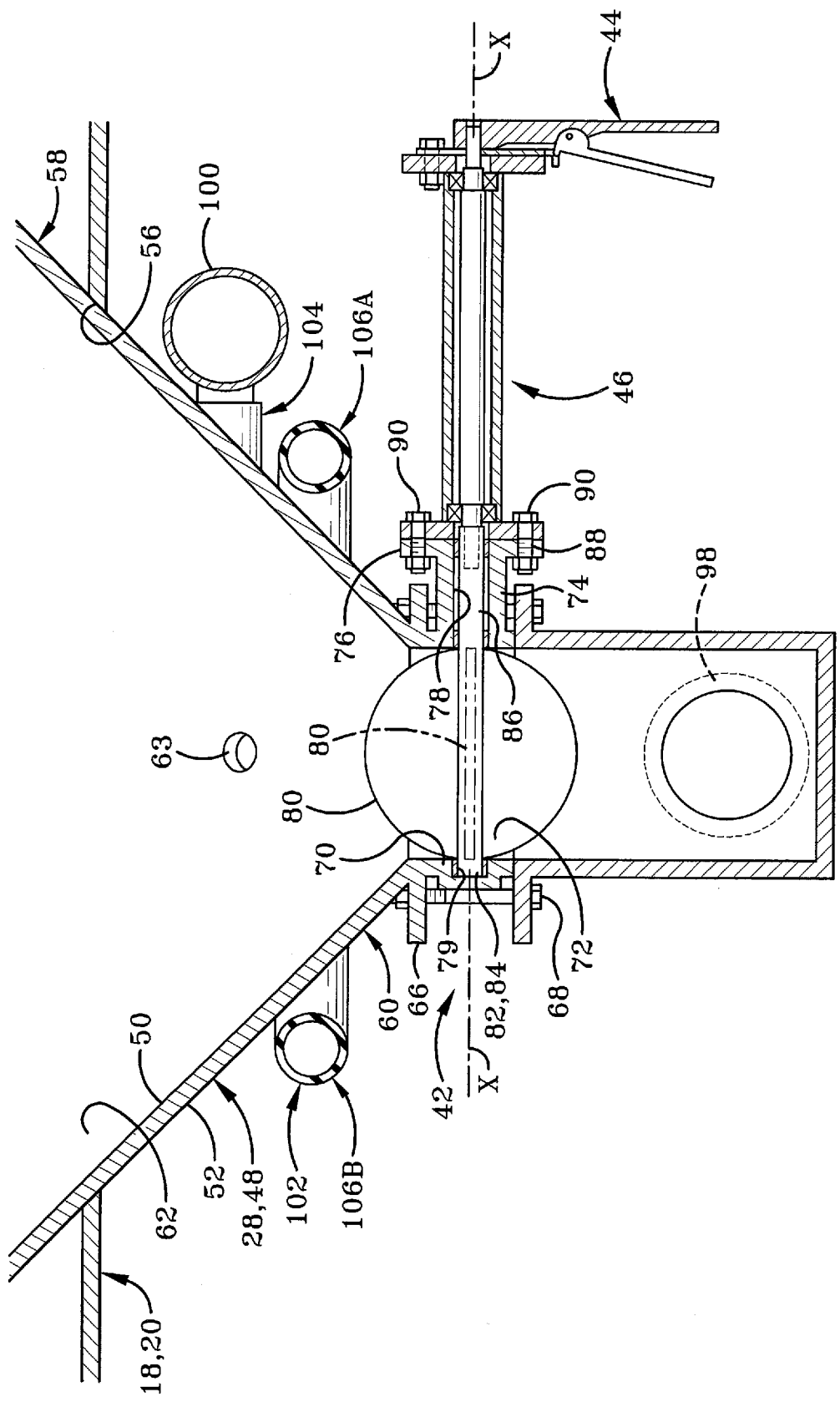
FIG. 3 is an enlarged sectional view through the longitudinal center of one of the valve control handles, handle extensions and the hopper shown in FIG. 2 taken from the front.

Hoppers 28 are now described in greater detail with primary reference to FIGS. 2 and 3. Each hopper 28 includes a conical or frustoconical sidewall 48 which tapers or angles downwardly and radially inwardly and has frustoconical arcuate inner and outer surfaces 50 and 52. Thus, the front portion of sidewall 48 and the inner and outer surfaces 50 and 52 thereof taper downwardly and rearwardly, the rear portion of sidewall 48 and its inner and outer surfaces 50 and 52 angle or taper downwardly and forward, the left portion of sidewall 48 and its inner and outer surfaces 50 and 52 angle or taper downwardly and rightward, and the right portion of sidewall 48 and its inner and outer surfaces 50 and 52 taper downwardly and leftward. Outer surface 52 is convexly curved as viewed from below. Each hopper 28 is mounted on deck 20 and more particularly extends through a circular through hole 56 formed through deck 20 such that an upper portion 58 of the hopper extends upwardly from deck 20 and a lower portion 60 of the hopper extends downwardly and axially inwardly from deck 20 toward center plane CL to adjacent the bottom of the given hopper 28 and the top of the given valve assembly 42. Upper portion 58 extends upwardly and axially outwardly from adjacent side 19 so that upper portion 58 extends outward of side 19 and higher than deck 20.

Referring again to FIG. 1, the rear of sidewall 48 of front hopper 28A and the front of sidewall 48 of the next hopper 28B intersect one another at an arcuate axially elongated intersection 59 adjacent the top of the upper portions 58 of hoppers 28A and B. Intersection 59 serves as a rear end of hopper 28A and a front end of hopper 28B. The rear of sidewall 48 of hopper 28B and the front of sidewall 48 of the rear hopper 28C intersect one another at an arcuate axially elongated intersection 61 adjacent the top of the upper portions 58 of hoppers 28B and C. Intersection 61 serves as a rear end of hopper 28B and a front end of hopper 28C. Inner surface 50 defines a hopper chamber 62 which is generally conical or frustoconical and is part of interior chamber 26. Chamber 26 of hopper 28B extends from a front end thereof at or adjacent intersection 59 to a rear end thereof at or adjacent intersection 61.

Figure 5:
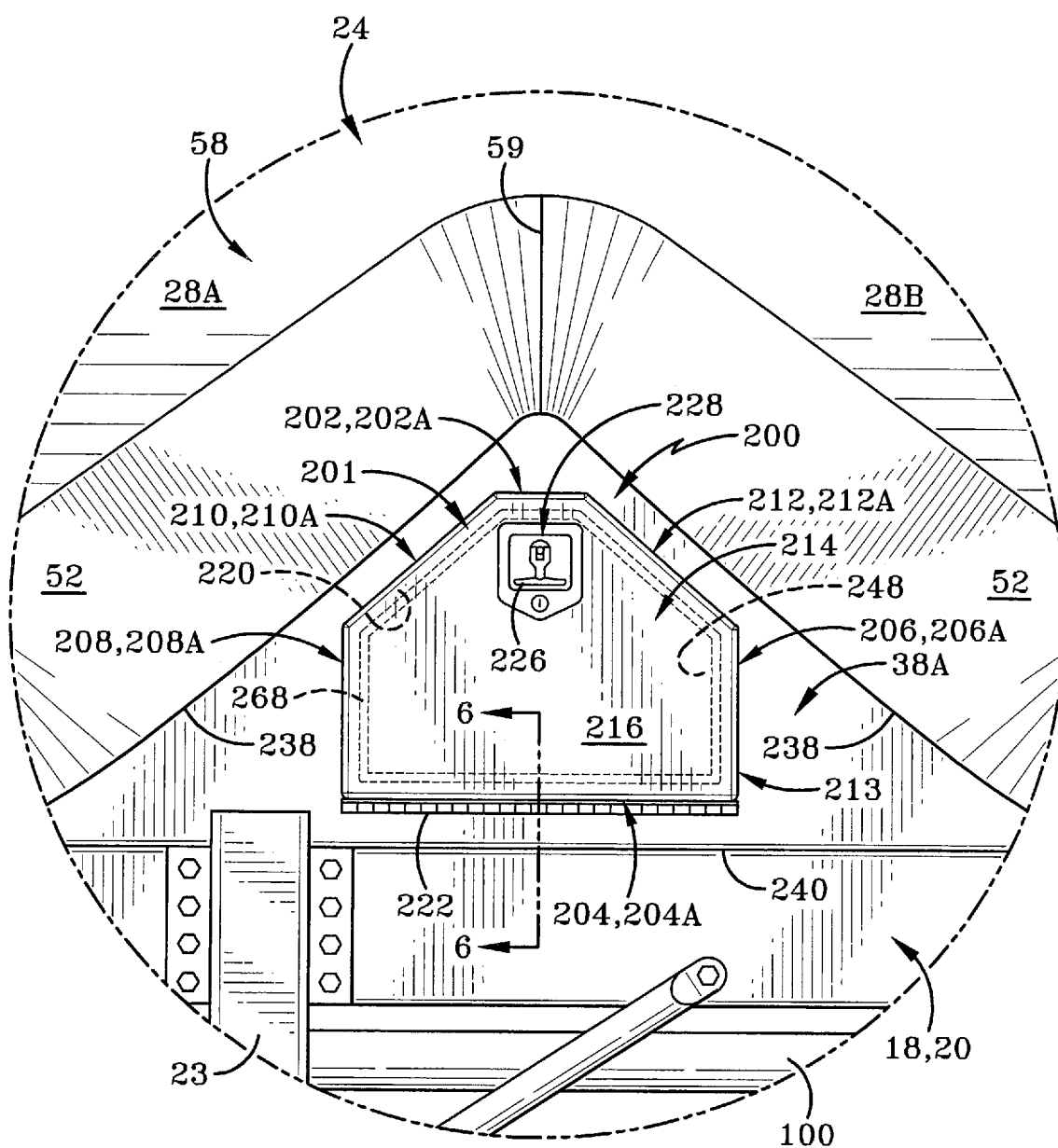
FIG. 5 is an example illustration of the integrated toolbox located between two hoppers on a hopper trailer with its door in a closed position.

In the exemplary embodiment and with primary reference to FIGS. 2, 3 and 5, each hopper 28 includes hopper air inlet ports 63 with air inlet port chambers 64A-C extending outwardly therefrom. These ports and chambers are formed along lower portion 60 and are lower than deck 20 and higher than valve assembly 42. Ports 64 are circumferentially equally spaced from one another (120 degrees apart as viewed from the bottom). More particularly, port chamber 64A is disposed generally along the left front of lower portion 60, port chamber 64B is disposed along the right front of lower portion 60 and port chamber 64C is at the rear of portion 60. A circular annular hopper flange 66 is rigidly secured to the bottom of the hopper and extends radially outwardly therefrom. Flange 66 is flat and horizontal as viewed from the side. Flange 66 defines a plurality of holes for receiving respectively there through a plurality of vertical bolts 68 which extend downwardly from flange 66.

With primary reference to FIGS. 2 and 3, valve assembly 42 includes a cylindrical valve chamber wall 70 which defines a cylindrical valve chamber 72, the top of which communicates with the bottom exit opening of hopper chamber 62 so that chamber 72 extends downwardly a short distance from the bottom of chamber 62 and serves as a hopper discharge port or passage. Bolts 68 rigidly secure chamber wall 70 to the bottom of hopper 28 with the top of wall 70 abutting flange 66 and extending downwardly therefrom. Assembly 42 further includes a cylindrical valve shaft passage wall 74 (FIG. 3) which is rigidly secured to and extends horizontally outward to the left from the left side of chamber wall 70 a short distance. Thus, the inner or right end of wall 74 is secured to chamber wall 70 and extends outwardly to an outer left end. A circular annular flange 76 is rigidly secured to and extends radially outwardly from the outer left end of passage wall 74 and is formed from a flat plate which is vertical as viewed from the front. Passage wall 74, flange 76 and the left side of chamber wall 70 define a horizontal axially extending valve shaft passage 78 which extends from the inner surface of chamber wall 70 which defines chamber 72 to the left or outer surface of flange 76. Passage 78 is thus a through passage. The right side of chamber wall 70 defines a closed valve shaft passage 79 which extends radially outwardly to the right from the inner surface of chamber wall 70 opposite passage 78. Thus, while through passage 78 communicates to the outside of the valve assembly from within chamber 72, closed passage 79 does not do so.

With continued reference to FIGS. 2 and 3, a butterfly valve 80 is disposed within valve chamber 72 and is pivotally movable between a closed position shown in dashed lines and an open position shown in solid lines. Center plane CL (FIG. 4) cuts through the axial center of each of chamber walls 70, chambers 72 and valves 80. Valve 80 is typically formed of a flat rigid plate or disc which has a circular outer perimeter for forming a seal with the circular inner perimeter or surface of chamber wall 70. A valve shaft 82 is rigidly secured to and extends outwardly from butterfly valve 80 in opposed left and right directions and more particularly includes a right end segment 84 and a left end segment 86. Segment 84 is mounted within passage 79 and left segment 86 is disposed within passage 78. Valve 80 and shaft 82 are rotatable about a horizontal axially extending axis which passes through shaft 82 and passages 78 and 79. Flange 76 defines a plurality of through holes 88 extending from the left to the right sides thereof for receiving there through horizontal axially extending bolts 90. As described in detail further below, handle extension 46 is secured to flange 76 by bolts 90 and extends axially outwardly therefrom to the left.

Air piping assembly 40 includes several air pipes including an air inlet pipe 92, a top air pipe 94, a blow down pipe 96, a substantially horizontal longitudinally elongated straight hopper discharge pipe 98, a main or primary hopper aeration pipe 100, and a plurality of hopper aeration branch pipe assemblies 102 which are respectively associated with hoppers 28A-C. Pipes 92, 94, 96, 98, 100 and the pipes of assemblies 102 are in fluid communication with one another, with various of these pipes in direct fluid communication with others of these pipes through intersections or other connections as noted below. Aeration pipe 100 may also be referred to as a heated air pipe or blow pipe in that it becomes hot or heated during operation of an associated air pump or compressor. Pipe 100 is typically a rigid pipe formed of metal (as are pipes 92, 94, 96 and 98). As shown in FIGS. 2 and 3, each branch pipe assembly 102 includes three air pipes, namely a primary branch pipe 104 and a pair of secondary branch pipes 106A and B. In the exemplary embodiment, pipes 104 and 106 are typically flexible pipes or hoses which are formed of an elastomeric material.

Referring to FIG. 1, the front horizontal portion of air inlet pipe 92 extends longitudinally above and adjacent front deck 22 and to the left of and adjacent front enclosure 32. The rear portion of pipe 92 extends downwardly behind front deck 22 and axially inward below rear deck 20 to the front of pipe 98. Top air pipe 94 is entirely above and adjacent front deck 22 and to the left of and adjacent front enclosure 32. The front vertical portion of blow down pipe 96 is to the left of and adjacent front enclosure 32, with the rear portion of pipe 96 extending from the bottom of the vertical portion axially inward into and through front enclosure 32 and downwardly and rearwardly to exit enclosure 32 along the rear of front deck 22 and the front of rear deck 20. The positions of discharge pipe 98 and aeration pipe 100 are described in greater detail further below.

Referring again primarily to FIG. 1, air inlet pipe 92 has a front inlet end 108 at the front of assembly 40 adapted to receive air there through to be pumped through the remainder of assembly 40. Inlet end 108 is removably attachable to an air feed line 110 which is connected to an air pump or compressor typically mounted on tractor 2 or another location typically not on trailer 1. Inlet end 108 communicates directly with external ambient atmosphere when not connected to feed line 110. Air inlet pipe 92 also has an opposed rear lower outlet end 114 which is rearward of and lower than front inlet end 108. Inlet end 108 serves as an upstream end while rear end 114 serves as a downstream end inasmuch as airflow typically enters end 108 and exits end 114 during operation of pump or compressor 112. Top air pipe 94 has a lower inlet or upstream end 116 which is connected to inlet pipe 92 at an intersection therewith. Top air pipe 94 has an upper outlet or downstream end 118 which is connected to blow down pipe 96 at an intersection therewith. Thus, top air pipe 94 is configured to receive airflow from air inlet pipe 92 via end 116 whereby the airflow may exit outlet end 118 into blow down pipe 96. Blow down pipe 96 has an upper end 120 and a lower end 122. Upper end 120 is connected at an intersection to tank 24 adjacent the top thereof whereby blow pipe 96 is in direct fluid communication with chamber 26. Top end 120 may serve as an inlet or upstream end or an outlet or downstream end of blow pipe 96 depending on the position of various valves, as discussed further below. Lower rear end 122 serves as an exit or outlet end through which airflow is discharged into the ambient atmosphere external to trailer 1.

With primary reference to FIG. 1, discharge pipe 98 has a front inlet or upstream end 124 which is connected to rear outlet end 114 of air inlet pipe 92 forward of and adjacent the front valve assembly 42 and the bottom of hopper 28A. Discharge pipe 98 further includes a rear outlet or downstream end 126 which is rearward of the rear valve assembly 42 and the bottom of rear hopper 28C. End 126 is typically adjacent rear end 8 of trailer 1 and serves as a discharge end through which airflow and material 27 are discharged adjacent the rear end 8. Pipe 98 thus extends from forward of all the valve assemblies 42 and all of the bottoms of the hoppers 28A-C to rearward of all the valve assemblies 42 and all of the bottoms of the hoppers 28A-C. Pipe 98 is typically straight, horizontal and parallel to center plane CL (FIG. 5, 6) from adjacent the bottom of front hopper 28A and front valve assembly 42 to adjacent the bottom of rear hopper 28A and rear valve assembly 42.

With primary reference to FIG. 1, primary aeration pipe 100 has a front inlet or upstream end 128 through which air flows into pipe 100 and a rear or downstream end 130 which is capped or closed in the exemplary embodiment. Upstream end 128 is connected at an intersection to air inlet pipe 92 at a location downstream of intersection 116 and upstream of the connection between downstream end 114 and upstream end 124. Inlet end 128 is thus upstream of all branch pipe assemblies 102 and their intersections with aeration pipe 100. Downstream end 130 is typically longitudinally adjacent and usually somewhat rearward of rear hopper 28C and the rear valve assembly 42.

Figure 8:
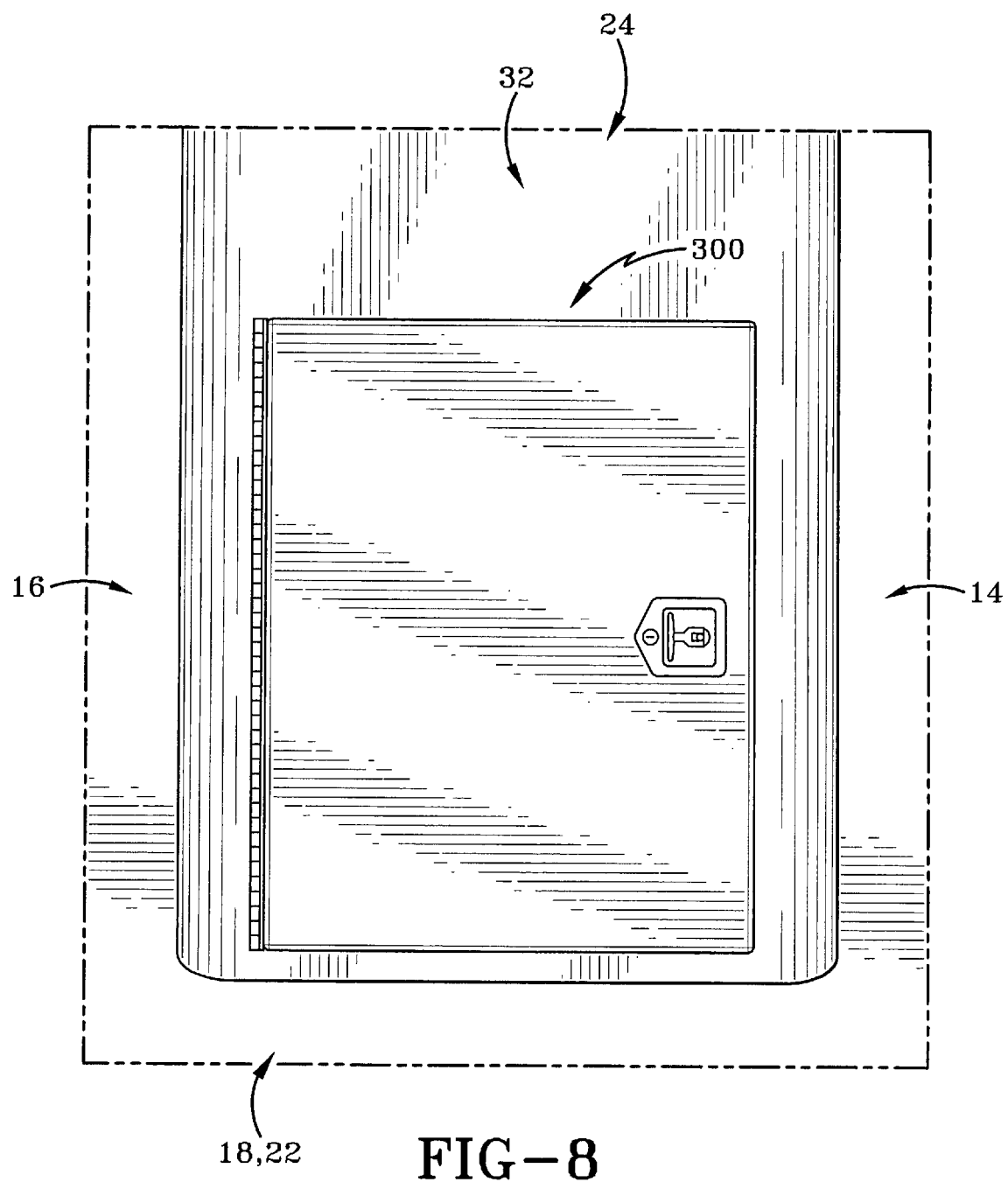
FIG. 8 is an example illustration of the integrated toolbox located on the front of a hopper trailer with its door in a closed position.
Figure 9:
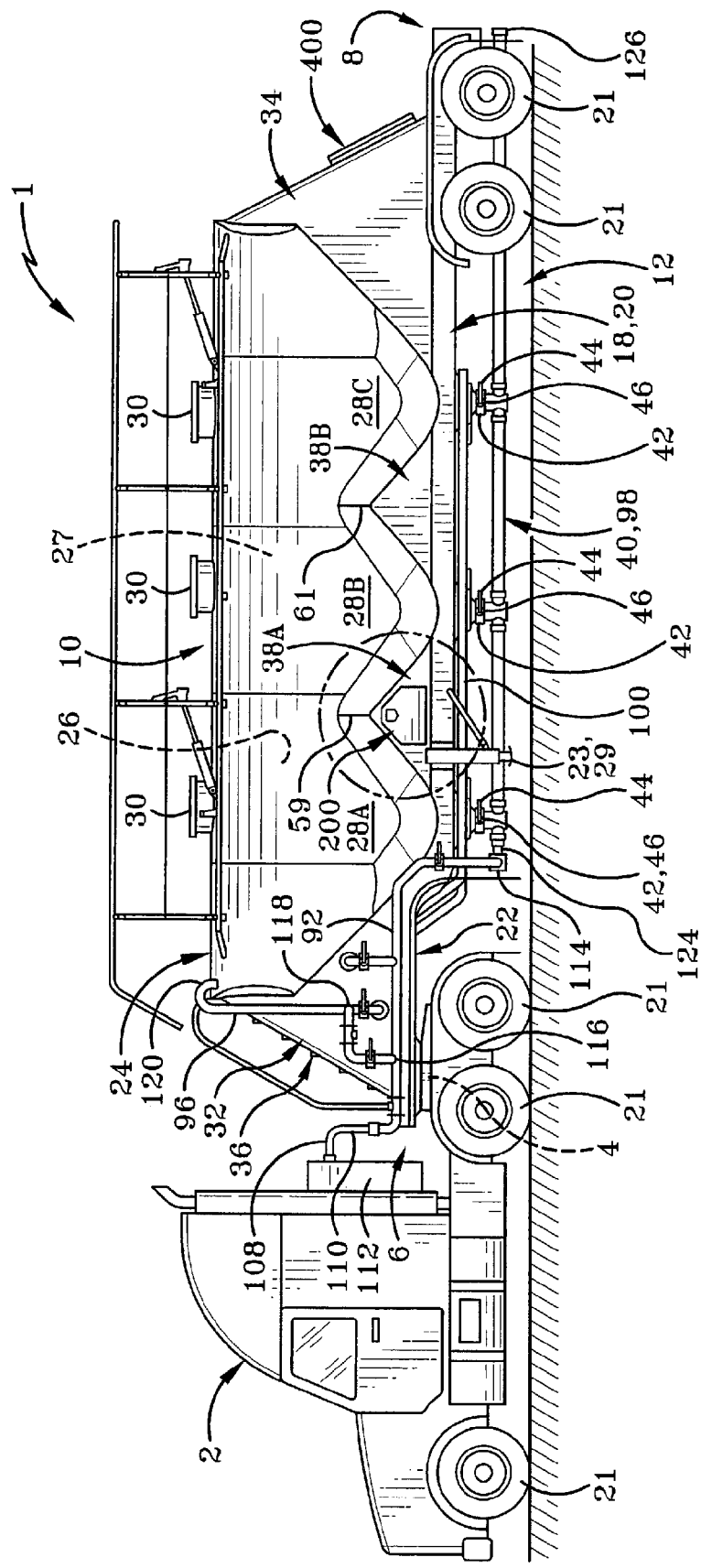
FIG. 9 is an example illustration of the integrated toolbox located on the rear of a hopper trailer with its door in a closed position.

In the preferred embodiment of the trailer 1, the trailer 1 includes an integral toolbox 200. As shown in FIGS. 1 and 5, in the preferred embodiment, the toolbox 200 is located between two of the hoppers 28. For example illustration purposes, the tool box 200 is shown integrally located in the lower enclosure 38A between hoppers 28A and 28B in FIGS. 1 and 5. Of course, the tool box can be located between any two adjacent hoppers 28. In other configurations of the preferred embodiment, the tool box 200 can be integrally located in the front enclosure 32 as integral tool box 300 shown in FIGS. 1 and 8 or in the rear enclosure 34 as integral tool box 400 as shown in FIG. 9. The doors of integral tool boxes 300 and 400 are generally rectangular in shape but in other ways can be similar to integral tool box 200 that is discussed in further detail below. When tool box 300 is located in the front enclosure 32 as shown in FIG. 1, then the built-in ladder 36 can be located at the rear of the trailer 1. However, when the tool box 400 is formed in the rear enclosure 34 as shown in FIG. 9, then the built-in ladder 36 can be relocated and formed integrally with forward enclosure 32.

The integral tool box 200 of FIGS. 1 and 5-7 is formed between two hoppers 28 with a door 201, a front wall 214, a top side 202, a bottom side 204, a right side 206 and a left side 208, as well as an angled top left side 210 and an angled top right side 212. These sides form a perimeter around the front wall 214. Front wall 214 is formed out of a sheet of metal and has a front side 216 and a back side 218. In the preferred embodiment, rearward (from the front side 216) projecting side walls 202A, 204A, 206A, 208A, 210A, 212A can form a perimeter wall 213 encircling the outside edges of the front wall 214 to form a cavity 220 between these walls and the front wall 214. Perimeter wall 213 can be formed by bending and welding plates of metal together or in other ways as understood by those of ordinary skill in the art.

The toolbox door 201 includes a hinge 222 for attaching it to a side wall of the lower enclosure 38A. The hinge 222 can be a metal hinge such as an elongated piano-type of hinge and hinge 222 can be attached a front side wall 236 of the lower enclosure 38A with bolts 224 or other suitable fasteners. Door 201 also has a handle 226 with a locking mechanism 228 for locking the door 201 in a closed position to the lower enclosure 38. The locking mechanism 228 is adapted to move a locking tab 230 into and out of a locking bar (not shown) on the lower enclosure 38A. The handle 226 with the locking mechanism 228 can include one or more keys for locking the handle 226 in the locked position to prevent unauthorized access to the integral toolbox 200.

The front side wall 236 of the lower enclosure 38A on the right side 16 of the trailer 1 is formed similar to a back side wall of the lower enclosure on the left side 14 of the trailer. These two sides, together with an upper surface 240 of the lower deck 20 and lower side walls 238 of hoppers 28A and 28B, form an enclosed tool box chamber 246 with an opening 248 generally complementary shaped to the door 201.

In the preferred embodiment, projecting side walls 252, 254, 256, 258, 260, 262 can form a perimeter wall 264 encircling the outside edges of opening 248 that is complementary the perimeter wall 213 formed by projecting side walls 202A, 204A, 206A, 208A, 210A, 212A of the door 201. The perimeter wall 264 can be formed by bending and welding plates of metal together so that the edges of the perimeter wall attached to the lower enclosure 38A are complementary shaped to the curves of the lower enclosure 38A so that there are no gaps between the lower enclosure 38A and the perimeter wall 264. However, the perimeter wall 264 encircling the outside edges of opening 248 forms a smaller perimeter wall that fits inside perimeter wall 213 of the door 201 when the door 201 is in the closed position.

A water seal 268 can be attached to the outward most edge of the perimeter wall 264 so that when the door 201 is in the closed position the surface of the back side 218 of the front wall 214 will press against the water seal 268 to create a water-tight fitting. The water seal 268 can be any suitable material such as a polymer type of material that has some give so that it conforms to the edge of the perimeter wall 213 of the door 201.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

The invention claimed is:

1. A bulk trailer comprising:
a bulk tank comprising a plurality of hoppers including a first hopper and a second hopper; wherein the first hopper has a first frustoconical sidewall which tapers downwardly and radially inwardly towards a bottom and which has a first frustoconical inner surface defining a first frustoconical hopper chamber; the second hopper has a second frustoconical sidewall which tapers downwardly and radially inwardly towards a bottom and which has a second frustoconical inner surface defining a second frustoconical hopper chamber; the second hopper chamber being directly behind the first hopper chamber;
a set of ground engaging wheels mounted on the bulk tank;
a first discharge port on the first hopper;
a second discharge port on the second hopper;
a discharge pipe connected to the first and second discharge ports, wherein the discharge pipe extends below the bottom of the first and second hoppers;
a storage box positioned entirely above the bottom of the first hopper and second hopper, and formed between and integral with the first hopper and the second hopper to define a storage chamber, the top of the storage chamber surrounded by the first and second hoppers, wherein the storage chamber extends longitudinally directly behind the first hopper chamber and longitudinally directly in front of the second hopper chamber;
a first portion of the storage chamber vertically directly below the first hopper chamber;
a second portion of the storage chamber vertically directly below the second hopper chamber;
a door mounted on the storage box having open and closed positions for respectively providing access to and blocking access to the storage chamber; and
a first portion of the door directly below one of the first and second frustoconical sidewalls.

2. The bulk trailer of claim 1 wherein a portion of the first hopper forms a portion of a first wall of the storage box and a portion of the second hopper forms a portion of a second wall of the storage box.

3. The bulk trailer of claim 1 further comprising:
a lock mounted on the door and configured to lock the door in the closed position.

4. The bulk trailer of claim 1 wherein
the first frustoconical sidewall has a rear portion which tapers downwardly and forward;
the second frustoconical sidewall has a front portion which tapers downwardly and rearwardly; and the door further comprises:
a right side with a right vertical edge and a right angled edge which is adjacent the front portion of the second sidewall and which angles downwardly and rearwardly to a top of the right vertical edge; and
a left side with a left vertical edge and a left angled edge which is adjacent the rear portion of the first sidewall and which angles downwardly and forward to a top of the left vertical edge.

5. The bulk trailer of claim 4 wherein the right angled edge is angled 45 degrees with respect to the right vertical edge, and wherein the left angled edge is angled 45 degrees with respect to the left vertical edge.

6. The bulk trailer of claim 1 further comprising a second portion of the door directly below the other of the first and second frustoconical sidewalls.

7. The bulk trailer of claim 1 wherein the storage chamber is entirely directly below the first and second hopper chambers.

8. The bulk trailer of claim 1 wherein the frame comprises a lower deck having an upper surface extending directly below the first and second frustoconical sidewalls;
the bulk tank has a left side and a right side;

the storage box includes a left sidewall along the left side of the bulk tank and a right sidewall along the right side of the bulk tank; and the storage chamber is at least partially defined by the first and second frustoconical sidewalls, the left and right sidewalls, and the upper surface of the lower deck.

9. A bulk trailer comprising:

a frame;

a set of ground-engaging wheels mounted to the frame;

a bulk tank comprising a plurality of hoppers including a first hopper having a first frustoconical sidewall which tapers downwardly and radially inwardly toward a bottom and a second hopper having a second frustoconical sidewall which tapers downwardly and radially inwardly toward a bottom;

a discharge pipe connected adjacent the bottom of the first and second hoppers at a respective first and second discharge port, wherein the discharge pipe is below the bottom of the first and second hoppers;

a toolbox positioned entirely above the bottom of the first and second hoppers with an interior chamber secured to the frame, the top of the interior chamber surrounded by the first and second hoppers;

a first portion of the interior chamber directly below the first frustoconical sidewall;

a second portion of the interior chamber directly below the second frustoconical sidewall;

a door mounted on the toolbox having an open position to provide access to the interior chamber and a closed position to block access to the interior chamber; and a first portion of the door directly below one of the first and second frustoconical sidewalls.

10. The bulk trailer of claim 9 further comprising:

a rear end of the bulk tank;

a top of the bulk tank; and a ladder adjacent the rear end of the bulk tank extending downwardly from the top of the bulk tank.

11. The bulk trailer of claim 9 further comprising:

a front end of the bulk tank;

a top of the bulk tank; and a ladder adjacent the front end of the bulk tank extending downwardly from adjacent the top of the bulk tank.

12. The bulk trailer of claim 9 further comprising:

a third sidewall extending from the first frustoconical sidewall to the second frustoconical sidewall; and an access opening formed in the third sidewall for accessing the toolbox.

13. The bulk trailer of claim 9 further comprising:

a lock mounted on the door and configured to lock the door in the closed.

14. The bulk trailer of claim 9 further comprising a second portion of the door directly below the other of the first and second frustoconical sidewalls.

15. The bulk trailer of claim 9 wherein the interior chamber is entirely directly below the first and second frustoconical sidewalls.

16. The bulk trailer of claim 9 wherein the frame comprises a lower deck having an upper surface extending directly below the first and second frustoconical sidewalls;

the bulk tank has a left side and a right side;

the toolbox includes a left sidewall along the left side of the bulk tank and a right sidewall along the right side of the bulk tank; and the interior chamber is at least partially defined by the first and second frustoconical sidewalls, the left and right sidewalls, and the upper surface of the lower deck.

17. The bulk trailer of claim 9 further comprising:

the first frustoconical sidewall has a rear portion which tapers downwardly and forward;

the second frustoconical sidewall has a front portion which tapers downwardly and rearwardly; and the door further including:

a right side with a right vertical edge and a right angled edge which is adjacent the front portion of the second sidewall and which angles downwardly and rearwardly to a top of the right vertical edge; and a left side with a left vertical edge and a left angled edge which is adjacent the rear portion of the first sidewall and which angles downwardly and forward to a top of the left vertical edge.

18. A bulk tank trailer comprising:

a bulk tank comprising a first hopper having a frustoconical sidewall which tapers downwardly and radially inwardly and which has a frustoconical inner surface defining a frustoconical hopper chamber;

a set of ground-engaging wheels mounted on the tank;

a discharge port secured to the first hopper adjacent a bottom of the frustoconical sidewall;

a storage box adjacent and integral with the first hopper and entirely above the bottom of the frustoconical sidewall, wherein the storage box defines an interior storage chamber surrounded by the frustoconical sidewall which extends one of (a) directly behind the frustoconical hopper chamber and (b) directly in front of the frustoconical hopper chamber;

a first portion of the storage chamber directly below the frustoconical hopper chamber;

a door mounted on the storage box having an open position to provide access the storage chamber and a closed position to block access to the storage chamber; and a first portion of the door directly below one of the first and second frustoconical sidewalls.

19. The bulk trailer of claim 18 wherein the frame comprises a lower deck having an upper surface extending directly below the frustoconical sidewall;

the bulk tank has a left side and a right side;

the toolbox includes a left sidewall along the left side of the bulk tank and a right sidewall along the right side of the bulk tank; and the interior chamber is at least partially defined by the frustoconical sidewall, the left and right sidewalls, and the upper surface of the lower deck.

20. The bulk trailer of claim 18 further comprising a second portion of the door directly below the other of the first and second frustoconical sidewalls.

* * * * *